March 1, 1960  W. G. STOECKICHT  2,926,550
MARINE PROPULSION PLANT
Filed Dec. 5, 1956  4 Sheets-Sheet 1
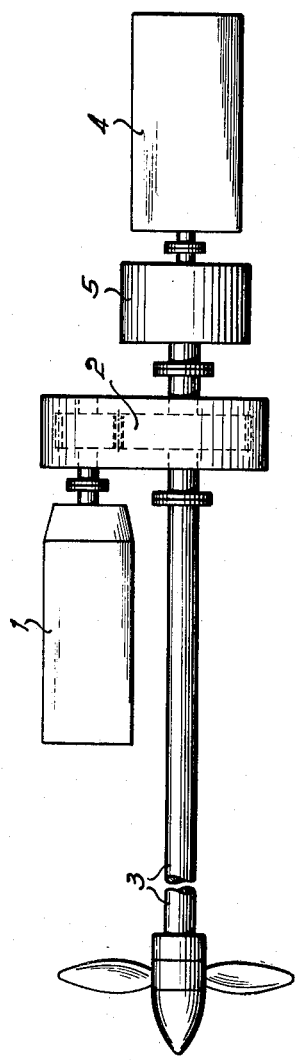
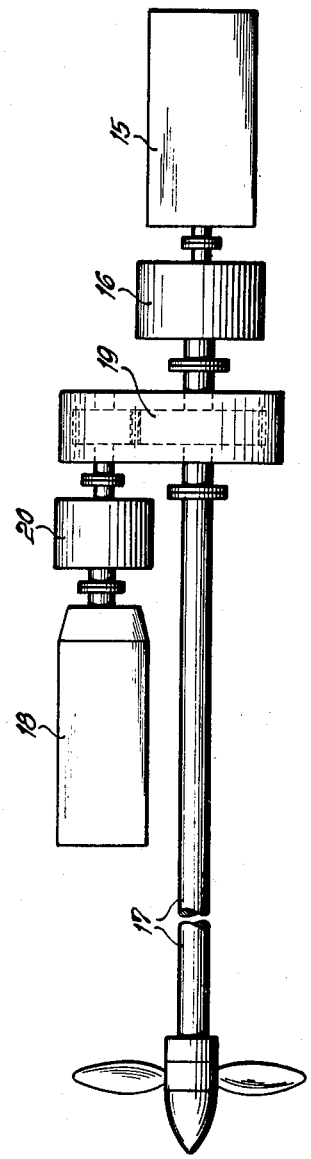
INVENTOR
WILHELM G. STOECKICHT
BY
Harness, Dickey & Pierce
ATTORNEYS.

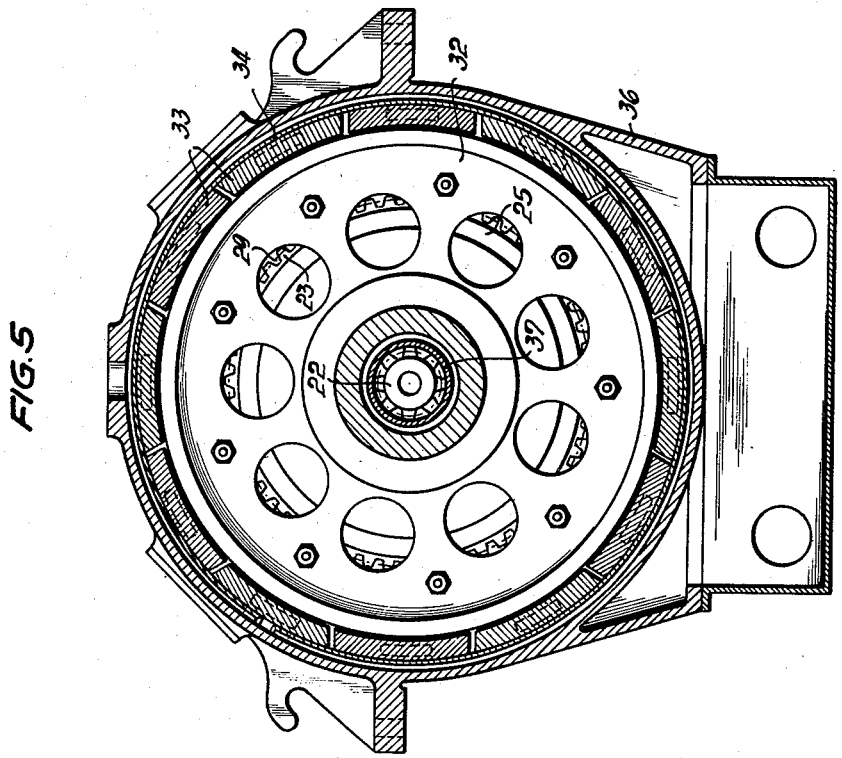
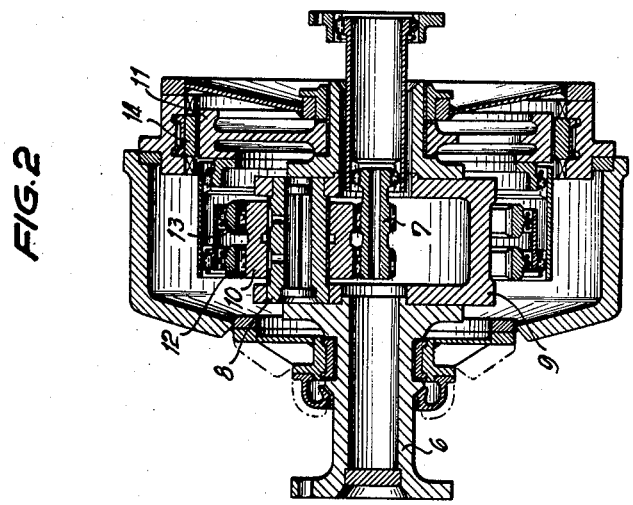

March 1, 1960
W. G. STOECKICHT
2,926,550
MARINE PROPULSION PLANT
Filed Dec. 5, 1956
4 Sheets-Sheet 3
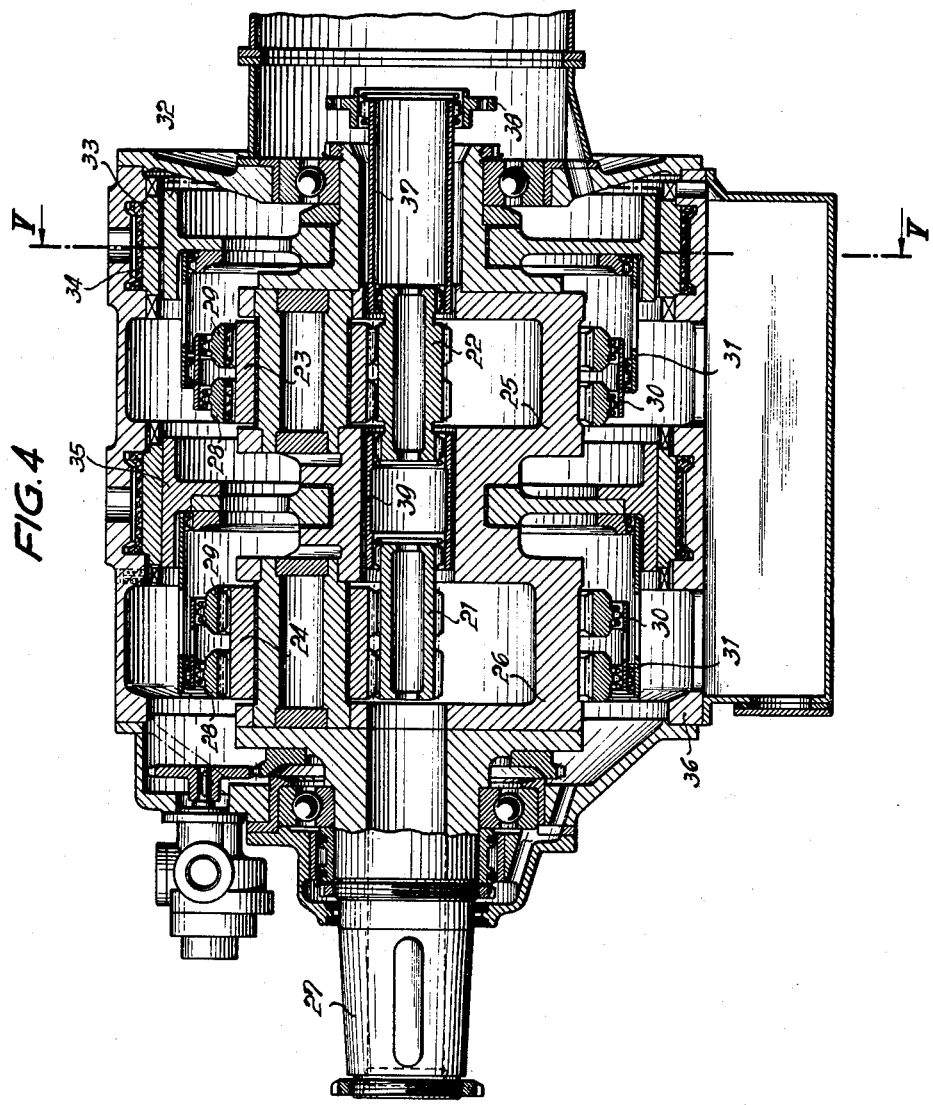
INVENTOR
WILHELM G. STOECKICHT
BY
Harness, Dickey & Pierce
ATTORNEYS.

March 1, 1960 W. G. STOECKICHT 2,926,550
MARINE PROPULSION PLANT
Filed Dec. 5, 1956 4 Sheets-Sheet 4

INVENTOR
WILHELM G. STOECKICHT
BY
Harness, Dickey & Pierce
ATTORNEYS.

United States Patent Office 2,926,550
Patented Mar. 1, 1960

2,926,550

MARINE PROPULSION PLANT

Wilhelm G. Stoeckicht, Munich-Solln, Germany

Application December 5, 1956, Serial No. 626,352

Claims priority, application Germany March 14, 1956

1 Claim. (Cl. 74—675)

The present invention relates to a marine propulsion plant comprising several power units connected to a common propeller shaft with at least one of said power units declutchably connected to the propeller shaft through an intermediate reduction gearing.

Many forms of construction of such marine propulsion plants are already known and all of them comprise a special clutch, generally a hydraulic clutch, in addition to the reduction gearing, for de-coupling the power unit.

One object of the invention is to simplify marine propulsion plants of the above mentioned art.

A further object of the invention is to diminish the costs for manufacturing marine propulsion plants of this kind.

Yet another object of the invention is to diminish the space occupied by marine propulsion plants of this kind.

A further object of the invention is to increase the reliability of operation of marine propulsion plants of this kind and to diminish the danger of operating troubles and breakdowns of marine propulsion plants of this kind.

Yet another object is to facilitate the starting of marine propulsion plants of this kind.

According to the invention the power unit is geared to the screw propeller shaft through an epicyclic gearing, of which one member is coupled to the propeller shaft, and the second member is coupled to the power unit, whereas the third member is controllable by means of a brake. The brake is preferred to be a friction brake, and more particularly a friction brake operable by hydraulic or pneumatic means.

Such a disposition substantially simplifies marine propulsion plants of the aforesaid kind, because a clutch is not required for the coupling and de-coupling of the power unit, this being done by the operation of the brake which is closely associated with the epicyclic gearing.

Marine propulsion plants of the aforesaid kind usually develop considerable power. It is therefore advisable to employ an epicyclic gearing designed for self-adjustment of the load between the planet wheels. Such epicyclic gearings have been described, more particularly, in U.S. Patent 2,703,021 granted to the inventor of this application, in which the epicyclic gearing is provided with double helical gears and at least one of the central wheels is divided to form two separate helical gear wheels with their teeth inclined towards each other. These two gear halves of the double helical gear are yieldably or flexibly connected together and they are likewise yieldably and flexibly connected with the member to which the central wheel transmits the troque.

It has been found that even marine propulsion plants of highest power can be geared down and controllably coupled in this way, an especially favourable feature being that though deformations in the vessel's hull cause certain deformations in the epicyclic casing the uniformity in the transmission of the load and the proper engagement of the teeth is not thereby impaired and that fracturing of the teeth does not occur.

In a preferred form of construction the propulsion plant comprises at least one reciprocating piston engine and at least one turbine, with at least the turbine geared to the screw propeller shaft through an epicyclic gearing controllable by a brake. This disposition allows the turbine to be started through the propeller shaft after the latter has been set in motion by the reciprocating piston engine. It will be readily understood that the reciprocating piston engine may be likewise geared to the screw propeller shaft through an epicyclic gearing controllable by a brake so that the reciprocating engine may be started without load.

Further improvements and convenient forms of construction of the invention will be more particularly described with reference to the accompanying drawings which diagrammatically represent a number of illustrative embodiments of the invention.

Fig. 1 is a view from above of a marine power plant according to the invention, comprising a diesel engine and a gas turbine;

Fig. 2 is an axial section through an epicyclic gearing with a brake, as incorporated in the form of construction shown in Fig. 1;

Fig. 3 is a view from above of a modified form of construction of the invention;

Fig. 4 is a longitudinal section through an epicyclic gearing giving two alternative gear ratios for performing the invention;

Fig. 5 is a cross section through line V—V in Fig. 4, and

Figure 6:
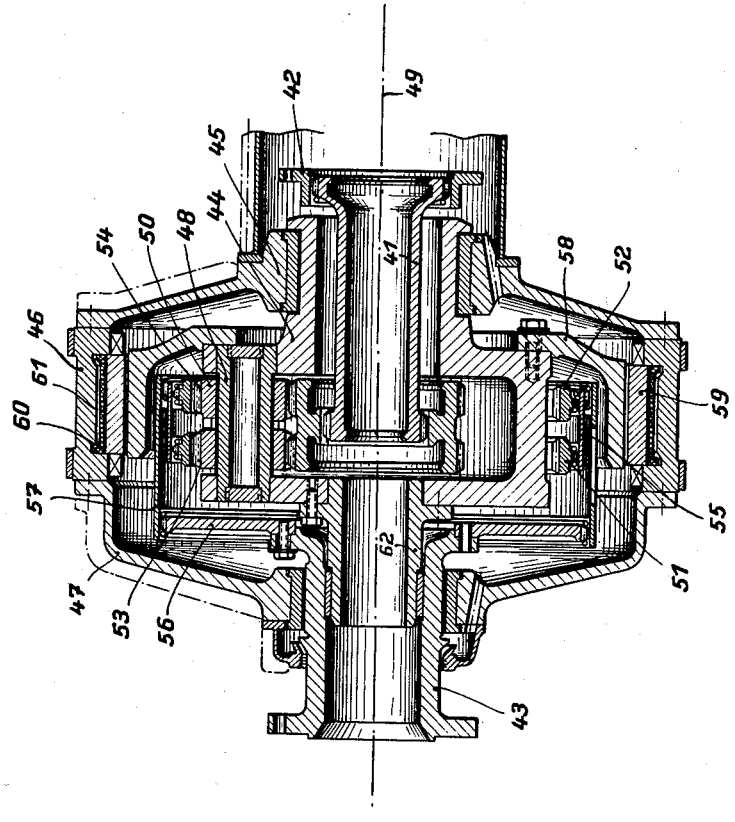
Fig. 6 is an axial section similar to Fig. 2 through another embodiment of an epicyclic gearing for carrying out the invention.

As shown in Fig. 1 a diesel engine 1 is geared to the screw propeller shaft 3 of a ship through a gearing 2. A turbine 4 is likewise geared to the screw propeller shaft 3 through a controllable epicyclic gearing 5.

Fig. 2 discloses details of construction of the epicyclic gearing 5. The main shaft 6 of the epicyclic gearing 5 is axially coupled to the screw propeller shaft 3 of the vessel, whereas the sun wheel 7 is coupled to the shaft of the turbine 4. The sun wheel 7 and the planet wheels 10 which run on pins 8 of the planet carrier 9 are provided, in a manner known per se, with double-helical gear teeth, whereas the outer gear ring is divided into two halves 12 and 13 which, in a manner likewise known per se, are relatively displaceably connected together and to the brake drum 11, each half meshing with the correspondingly inclined set of teeth on the planet wheels 10. The brake drum 11 is rotatably mounted and can be braked by means of braking means 14. An epicyclic gearing of this kind ensures that the distribution of the load between the planet wheels is always practically balanced.

Fig. 3 shows a disposition of the gearing in which, as in Fig. 1, a turbine 15 is de-clutchably geared to the screw propeller shaft 17 by means of an epicyclic gearing 16, whereas a second epicyclic gearing 20 likewise provided with a brake is arranged between the diesel engine 18 and the transmission gearing 19 through which the diesel engine 18 is geared to the screw propeller shaft 17. Both the epicyclic gearing 16 and the epicyclic gearing 20 correspond in their general structural arrangement with the gearing shown in Fig. 2, the required gear ratio being established by suitably selecting the number of the gear teeth. In the epicyclic gearing shown in Fig. 2 the outer gear ring is controlled by the braking means for the purpose of coupling and decoupling the engine. Alternatively, the barke may be arranged to act upon the carrier, in which case the outer gear ring would be connected with the driven shaft.

Instead of the simple epicyclic gear train as above described, there might likewise be provided an epicyclic gearing transmitting several gear ratios. Figs. 4 and 5 show such a gearing.

The gearing substantially consists of two (or of several) epicyclic gear trains in series, in each of which one member can be separately braked. In the form of construction shown in Figs. 4 and 5 the brakes act on the outer gear rings. Again the gears are of the double helical pattern. The two sun wheels 21, 22 mesh with the planet wheels 23, 24 mounted on the carriers 25, 26, which are rigidly connected together as well as to the driven shaft 27. Each carrier 25, 26 rotatably carries a plurality, of, for instance three, planet wheels. The shaft 27 is coupled to the screw propeller shaft in a manner not specially shown.

The outer gear ring which meshes with the planet wheels 23 is subdivided in a manner known per se into two rings 28 and 29, each with normal helical gear teeth and they are connected together as well as to a brake drum 32 through double gear couplings 30, 31, the drum being rotatably mounted on the carrier of the planet wheel 25. This brake drum 32 can be braked by means of a hydraulic brake comprising a plurality of brake shoes 33 and an enveloping brake band 34.

The outer gear ring which meshes with the planet wheels 24 is similarly constructed, and the same reference numerals have been used to indicate analogous parts. It is connected with a brake drum 35 rotatably mounted on the planet wheel carriers 25 and 26 and this drum can be likewise braked by means of a hydraulically operable brake, the fluid of which is adapted to absorb heat generated by the braking means.

Whereas the shaft 27 and the associated planet wheel carriers 25 and 26 run on bearings in a common casing 36, the sun wheels 21, 22 are free floating. The sun wheel 22 is coupled through a double gear coupling 37 with a flange 38 which may be connected, for instance, with a gas turbine. Moreover, the two sun wheels 21, 22 are interconnected by means of a double gear coupling 39.

The two epicyclic gear trains 22, 23, 28—29 and 21, 24, 28—29 are designed to transmit different gear ratios. By applying one of the brakes and thereby one of the outer gear rings 28—29, the turbine can be made to transmit to the screw propeller shafts through different gear ratios. This may be extremely useful for obtaining optimum turbine speeds at different propulsive speeds of the vessel, and may be a matter of importance when using marine power units other than gas or steam turbines, such as for instance diesel engines and other power plant.

According to Fig. 6 a sun gear wheel 40 is coupled with a driving turbine or motor by means of a double gear coupling 41 and a flange 42. The driven shaft 43 of the epicyclic gearing is drivably connected to a screw propeller shaft not shown.

An arm or planet wheel carrier 44 is rotatably supported on the one side in a boring of the driven shaft 43 by means of a stub shaft 62 and on the other side in a cover 45, which is fixed to a gearing housing 46. This housing 46 is likewise provided with another cover 47 which serves as supporting means for the driven shaft 43.

There are provided on the arm or planet wheel carrier 44 a plurality of pins 48 equidistantly arranged one from another and on the same radius with respect to the common axis 49 of the epicyclic gearing. These pins 48 serve as supporting means for planet gear wheels 50, the teeth of which being in mesh with the teeth of the sun gear wheel 40. The planet gear wheels as well as the sun gear wheel have inclined gear teeth in double helical arrangement, the gear tooth inclination adjacent one side of these gear wheels being opposite the gear tooth inclination adjacent the other side thereof.

There are provided two separate single outer gear rings 51, 52, the gear tooth inclination thereof being opposite one with respect to another. These two outer gear rings are in mesh with the two halves 53 and 54 of the planet gear wheels 50 and are flexibly connected one with another by means of a double gear coupling 55, whilst this double gear coupling 55 is flexibly connected with a disk member 56 by another double gear coupling 57. The disk member 56 is fixedly connected to the driven shaft member 43.

The arm or planet carrier 44 is provided with a brake drum 58, which is adapted to be braked by means of a plurality of brake shoes 59. These brake shoes are enveloped by a flexible seal ring 60, which serves as yieldable and displaceable means for sealing a ring-formed cylinder 61. A fluid pressure supply not shown is connected in a manner likewise not shown to this ring-formed cylinder for frictionally engaging the brake shoes 59 with the brake drum in case that the carrier 44 shall be held stationary. The fluid is therefore adapted to absorb heat generated by the braking means. The retraction of the brake shoes 59 to their unengaged position takes place by means of resilient members known per se and therefore not shown.

The forms of construction as described relate exclusively to the use of a turbine and a diesel engine. However, it will be readily understood that the invention may be likewise adapted to combinations of engines of like kind, such as turbines only, or diesel engines only.

The invention may also be employed in plant comprising more than two power units.

What I claim is:

A marine propulsion plant comprising an internal-combustion engine prime mover, a turbine prime mover, a propeller shaft, a first epicyclic gear train between said internal-combustion engine and said propeller shaft, a second epicyclic gear train between said turbine and said propeller shaft, each of said epicyclic gear trains comprising sun gear means, ring gear means and planet gear means between said sun and ring gear means, one gear means of each train being directly connected to its respective prime mover, another gear means of each train being directly connected to said propeller shaft, an annular axially extending brake drum secured to the remaining gear means of each train, a casing for each train, an annular hydraulic chamber in each casing surrounding its corresponding brake drum, and drum-engaging braking means surrounding each brake drum and actuable by fluid within the corresponding annular chamber to frictionally brake said remaining gear means, whereby said fluid is adapted to absorb heat generated by said braking means.

References Cited in the file of this patent
UNITED STATES PATENTS

| | | |
|---|---|---|
| 1,621,915 | Weston | Mar. 22, 1927 |
| 2,007,032 | Wach | July 2, 1935 |
| 2,330,985 | Meyer | Oct. 5, 1943 |
| 2,366,646 | Orr | Jan. 2, 1945 |
| 2,410,556 | Ware | Nov. 5, 1946 |
| 2,450,214 | Ware | Sept. 28, 1948 |
| 2,703,021 | Stoeckicht | Mar. 1, 1955 |
| 2,737,064 | Stoeckicht | Mar. 6, 1956 |

FOREIGN PATENTS

| | | |
|---|---|---|
| 595,221 | Great Britain | Nov. 28, 1947 |